No. 702,020. Patented June 10, 1902.
J. L. MAULDIN.
SPRING BALANCE SCALE.
(Application filed May 3, 1897.)
(No Model.)
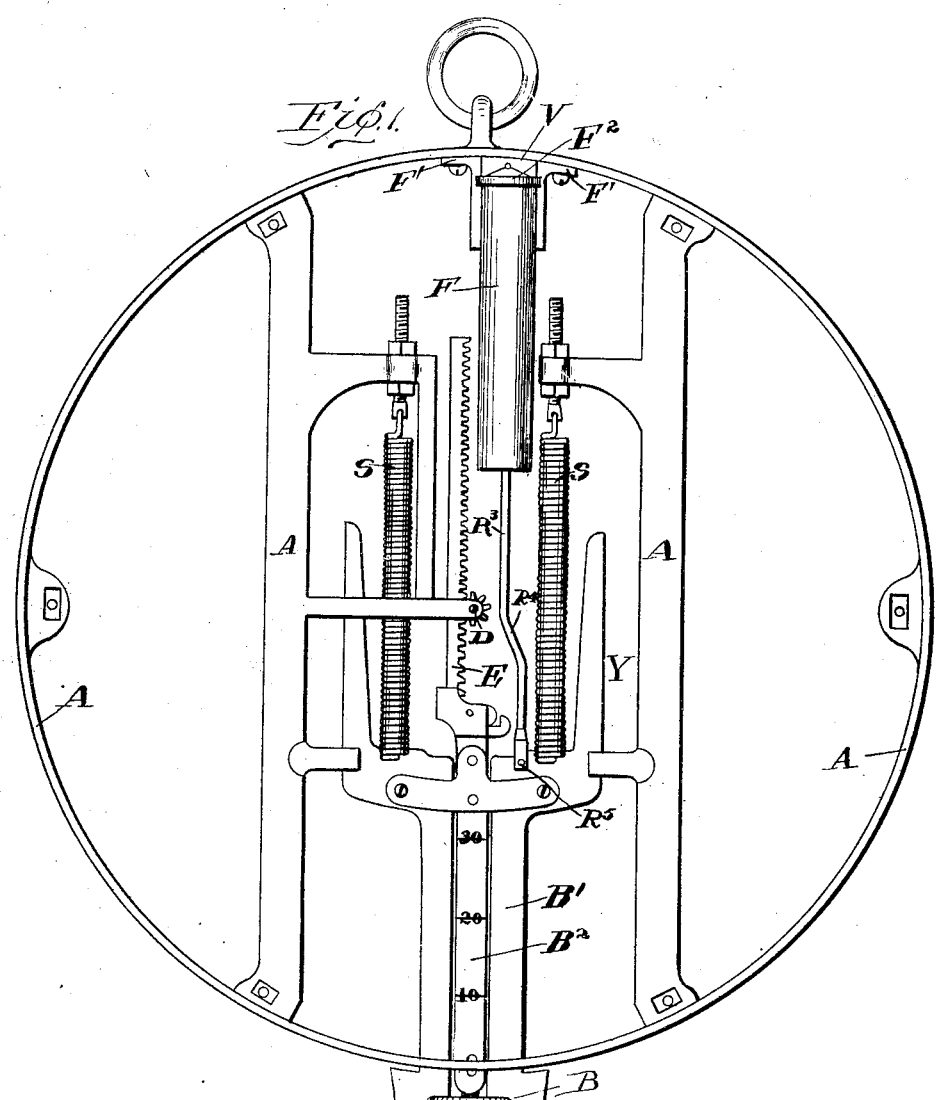
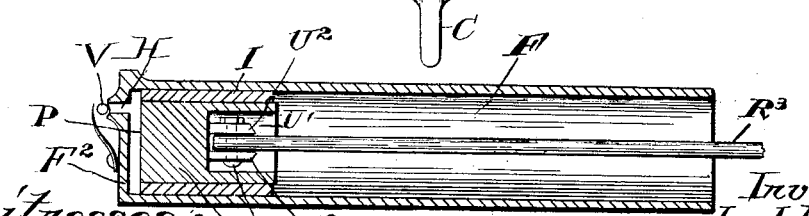
Witnesses:
H. W. Thayer
K. Jennie
Inventor,
Jas. L. Mauldin.
By [signature]
Atty.

UNITED STATES PATENT OFFICE.

JAMES L. MAULDIN, OF CLEVELAND, OHIO, ASSIGNOR TO THE COMPUTING SCALE COMPANY, A CORPORATION OF OHIO.

SPRING-BALANCE SCALE.

SPECIFICATION forming part of Letters Patent No. 702,020, dated June 10, 1902.

Application filed May 3, 1897. Serial No. 634,864. (No model.)

*To all whom it may concern:*

Be it known that I, JAMES L. MAULDIN, a citizen of the United States, residing at Cleveland, in the county of Cuyahoga and State of Ohio, have invented certain new and useful Improvements in Spring-Balance Scales, of which the following is a specification.

My invention relates to spring-balance or other automatic counterbalancing scales of the type in which a load-receiver is supported by an automatic counterbalancing member or members and an indicator of usual construction, but not shown, actuated proportionate to the gravity of the load placed upon the load-receiver, said indicator being adapted to designate one or more series of characters indicating weights or money values at different rates per unit, and a controller for preventing undue vibrations of said indicator and its actuating parts; and it more particularly relates to the construction, arrangement of the parts, and mode of operation of said controller, as well as the combinations, constructions, and arrangements of the parts of a scale embodying said controller, the features of novelty being specially set forth in the annexed claims.

In referring to the accompanying drawings, forming a part hereof, Figure 1 is a front elevation of a spring-scale having its front plate and indicator removed and illustrating my improved controller arranged within the casing; and Fig. 2 illustrates a central vertical section of the cylinder, its piston, and connection with said piston, constituting the controller.

In said drawings like characters of reference indicating corresponding parts, S S indicate oppositely-located load-counterbalancing members or springs suspended from or near the upper inside of the circular casing A and attached at their lower ends to the cross-arm of a draft-bar B'. The lower end of the draft-bar B' protrudes downwardly through the casing A and has attached to its extreme end a hook or loop C, adapted to connect said bar B' with a load receiver or platform. (Not shown, but of ordinary construction.) D represents the indicator driving-shaft having bearings in said casing and to which is adapted to be secured a suitable indicator (not shown) for indicating one or more series of characters representing pounds and fractions or money. Said shaft is centrally between said springs S and is connected to draft-bar B directly below and in line therewith by a pivoted rack-bar E, meshing with a pinion upon and adapted to drive said shaft or revoluble part D, said rack-bar E being held in engagement with said pinion by a projection of the casing or frame. (Not shown, but of usual construction.) A smooth hollow tube F is secured at its upper end by feet or projections F' to the upper inside of the frame A, with its axial line parallel and between the axial lines of said counterbalancing members or springs S S, said axial lines of said tube and members being in substantially the same vertical plane. This arrangement of controller or tube and said counterbalance members or springs may be popularly described as the "controller," (tube F and the piston,) being sandwiched between the load-counterbalancing members. The top of this tube is in this instance closed by head F², through which in this instance extends a small opening H, controlled in this instance by valve V of the ball type. The lower end of said tube F is open to the full diameter of said tube, in this sense the tube being what I shall term a "downwardly-extending" tube.

Referring to Fig. 1, the connecting-rod R³ is pivoted to piston P, as hereinafter described, and the lower end of said rod R³ is provided with a lateral bend R⁴ to enable said rod to pass projecting parts of the scale and connect with the pivot R⁵ to one side of the center of draft-bar B', which is provided with a central tare-adjusting bar B², to the top of which is pivoted the rack E in the usual manner; but for the purposes of my invention said bar may be constructed in any desirable manner. Said bar B' in the instance shown is bifurcated and said bar B² slidingly mounted in the furcation. The lower end of said bar B², projecting from the casing A, is threaded and engaged by a thumb nut or wheel B, revolubly but non-longitudinally mounted in slots formed in said bar B', so that upon turning wheel B its engagement with said threaded portion of bar B² moves said bar B² vertically with said rack E, which moves revoluble part D and adjusts the indicator (not shown, but of usual construction) to zero or other desired portion. The lower end of rod $R^3$ is pivoted to the top of the cross-arm of bar $B'$, adjacent the furcation in said bar $B'$, in which said bar $B^2$ slides, and while the pivot $R^5$, Fig. 1, is nearer one spring S than the other the axis of said tube F in the same plane with bar $B'$ and between the axis of said springs or counterbalancing members is nearer a central point between said springs or members, so that the resistance of said tube and its piston influences the near spring S but little more than the other and during normal movements is not perceptible. It will therefore be observed that the tube, piston, springs, and said bar B being all in the same vertical plane is of more vital importance than the exact point of central location of said tube between said springs.

In Fig. 2 I have shown a construction of piston P in which a relatively long (preferably graphite) exterior shell I is provided with a central and integral metallic body U, having in its lower end a central recess $U'$, extending substantially one-half the length of said body U. Projecting downwardly from the center of said recess $U'$ are lugs $U^2$, between which is loosely pivoted the upper end of said rod $R^3$ by pivot-pin $R^6$, in this instance passing through lugs $U^2$ and rod $R^3$. In Figs. 1 and 2 the pivotal point of attachment of rod $R^3$ and the piston by said pin $R^6$ is at a point substantially in the center of the length of said piston in order that said piston may more freely accommodate itself to the sides of said tube F, and thereby lessen the frictional contact, as well as to more evenly distribute the thin film of air that passes around said piston to or from the upper end of said tube F. Said body U may be secured to shell I by fine screw-threads, cement, or in any other durable manner.

Having fully described the construction, I will now proceed to describe the operation, for which purposes it will be assumed that shaft D operates one or more indicators adapted to indicate one or more series of characters indicating pounds and ounces or money values at different rates per unit, which characters are designated or indicated proportionate to the downward movement of bar $B'$, as in ordinary scales of the spring or automatic counterbalancing type. Upon the downward movement of bar $B'$, caused by attaching goods thereto or placing same upon the load-receiver attached to said bar $B'$, the piston moves downward in tube F a corresponding distance through the action of its rod $R^3$, connecting with said bar, thus producing a vacuum between said piston and the head $F^2$ of said tube F, which vacuum prevents bar $B'$ from moving other than steady and prevents jars to and rupture of the rack and pinion and indicators. The drawing downward of the piston during the movement of the scale parts to indicate the weight or value, or both, I regard as tending to increase the accuracy of the scale, inasmuch as no part of the power required to produce a vacuum in tube F causes any friction between the periphery of the piston and the bore of tube F by reason of the intervening film of air when the piston is drawn downward by the connecting-rod $R^3$, pivoted at its lower end to the draft-bar $B'$ by pivot $R^5$ and at its upper end to the center of the length of the piston by pin $R^6$, and, further, by reason of said alinement of said tube, springs, and draft-bar being in the same vertical plane and said tube or controller being intermediate and in the same vertical plane with said counterbalancing members or springs and when the bar $B'$ approaches the limit of its proper downward movement for a given load the leak of air through valve V and about the periphery of the piston quickly destroys said vacuum and permits bar $B'$ and the other movable parts of the scale to quickly assume their proper position and the indicator or indicators (not shown) to indicate the proper characters almost without a perceptible vibration. When the load is removed from the bar $B'$, the piston compresses air between it and the head $F^2$ of the tube F, (and said piston pivoted to the top of the connecting-rod $R^3$ and said rod $R^3$ pivoted at its lower end to said bar $B'$ is liable to cause said piston to be forced laterally against the bore of tube F by said compressed air and cause a small amount of friction on the return to normal position of the bar $B'$ and its normal parts;) but said possible friction, be it great or small, cannot affect the accuracy of the indicator, as it occurs, if at all, on the return movement, which is not the weighing or indicating movement, and if it occurs at all it lasts but momentary, as said valve V completely reduces said compression as the parts return to normal position and the piston nears the head $F^2$ of said tube, which reduction of said compression permits the indicator or indicators (not shown) to stand invariably at zero at each return.

The graphite shell I, forming the exterior wall of the piston, lessens any and all frictional contact between the relatively long exterior wall of the piston and the interior wall of the tube F, which friction is reduced to a minimum by the pivotal connection of said rod $R^3$ in substantially the center of the length of said piston.

From the foregoing it is obvious that it is not deemed so essential to have the controller or cylinder in the same plane with the draft-bar as it is to have the axis of said controller or cylinder and the connection between said draft-bar and piston parallel with and intermediate the axis of said counterbalancing members or springs and the connecting-points of said members or springs and all in the same plane with the draft-bar, so that all the resistance to the movement of said draft-bar is in the same plane with said draft-bar, or, more specifically speaking, so that the resistance to the vertical movement of said draft-bar all comes in a series of vertical lines all in line with the direction of the vertical line of draft upon the draft-bar, said vertical lines being in this instance located in the same plane, whereby lateral movement or deflection of the draft-bar is prevented.

It will be observed that the bar $B^2$ is provided with a series of characters adapted to be indicated as said bar $B^2$ is exposed by being drawn out of the casing A with the draft-bar B', and that the characters on said bar $B^2$ will be indicated proportionate to the movement of said draft-bar B', and that by adjusting the wheel B said bar $B^2$ will be adjusted relatively to said bar B', and consequently the portion of its indications will be likewise varied with respect to said draft-bar B' and the controller, so that the position of said indications on said bar $B^2$ may be varied independent of said controller and without changing the position of or acting upon said controller. It will furthermore be observed that with said indicating characters on said bar $B^2$ said bar $B^2$ constitutes an indicator in the same sense and accomplishes substantially the same purpose in this instance as the usual indicator operated by shaft D, the only difference being that said bar $B^2$ indicates in this instance characters in multiples of the sums usually indicated by the indicator usually driven by shaft D. It will furthermore be observed that it is immaterial for the present purpose whether the indicator is driven directly or indirectly by the draft-bar and whether the indicator is driven in the arc of a circle or in a straight line, as in the instance shown.

In the claims where mention is made of the term "indicator" or an equivalent term it will in the instance shown be specifically understood as referring to the bar $B^2$ and the characters thereon.

From the top of casing A projects a lug X, provided with an opening through which is passed a ring Y, by means of which ring the scale is adapted to be supported in operation, the springs or counterbalancing members S being secured below and on opposite sides of said securing-ring Y and the tube or resisting means F being secured directly below said ring Y, so that the support for the casing is in the same vertical plane with the vertical axis of said tube F, the springs S, and the line of draft upon the draft-bar, and when load is applied to the draft-bar the casing A is not moved laterally, as would be the case if said support for the casing were not in the same horizontal plane as the vertical axis of said springs and tube.

As the placing of the support for the casing in the same vertical plane with the vertical axis of the springs is not new, the novelty in this instance lies in arranging the resisting means between said springs and in the same vertical plane with said support for the casing, the springs or counterbalance members, and the line of draft of the draft-bar, and specifically the mounting of said resisting means directly below said support for said casing and in the same plane therewith and with said springs and draft-bar.

Having now fully described the construction and operation of my invention, what I claim, and desire to secure by Letters Patent, is—

1. In a scale, the combination of a draft-bar supported by oppositely-located load-counterbalancing springs, a revoluble shaft intermediate said springs, a pinion on said shaft, a rack-bar pivoted to said draft-bar and meshing with said pinion, a casing containing bearings for said shaft, a downwardly-projecting open-mouthed tube secured to said casing and having its longitudinal center substantially parallel with and sandwiched between said springs, a piston in said tube, and a piston-rod which is flexibly connected at one end with the piston and at the other end with said draft-bar; substantially as specified.

2. In a scale, the combination of a draft-bar supported by oppositely-located load-counterbalancing springs, a revoluble shaft intermediate said springs, a connection intermediate said bar and shaft for revolving said shaft, a casing containing bearings for said shaft, suspending means pivotally connected to said casing, a downwardly-projecting open-mouthed tube secured to and projecting within said casing, said tube, springs, and the pivotal point of suspension of said casing being in substantially the same plane, said tube being parallel with said springs, a piston in said tube, and a connecting-rod loosely pivoted to said draft-bar and to said piston; substantially as specified.

3. In a scale, the combination of a draft-bar supported by oppositely-located vertical load-counterbalancing springs, a revoluble shaft intermediate said springs, a connection intermediate said bar and shaft for revolving said shaft, a casing containing bearings for said shaft, a downwardly-projecting open-mouthed tube secured within said casing and having its longitudinal center substantially parallel with and intermediate said springs, a relatively long piston in said tube, a bearing of antifriction material between said piston and the bore of said tube, a connecting-rod loosely pivoted to said draft-bar and to said piston; an indicator movable proportionate to the elongation of said springs; and said casing normally inclosing and protecting the parts from dirt, accident or manipulation; substantially as specified.

4. In a scale, the combination of a draft-bar supported by oppositely-located load-counterbalancing springs whose axial lines are in the same plane with the draft-bar; a revoluble shaft intermediate said springs; a connection between said bar and shaft for revolving said shaft; a casing provided with bearings for said shaft; a cylinder secured within said casing parallel with and between the axis of said springs and extending a portion of the length of said springs; a relatively long piston in said tube; a recess in one end of said piston; a connection loosely pivoted at its upper end to said piston intermediate its length and in said recess, said connection being loosely pivoted at its lower end to said draft-bar at a point below said cylinder; an indicator movable proportionate to the movement of said springs; said casing normally inclosing and protecting said parts; and said springs, draft-bar, cylinder and connection being all in substantially the same plane; whereby a vacuum is formed in said cylinder on the application of a load to said draft-bar, and whereby the vibration of said shaft and the lateral deflection of said draft-bar are prevented, substantially as specified.

5. In a scale, the combination of a draft-bar supported by oppositely-located load-counterbalancing springs; means for applying load to one end of said draft-bar; a revoluble shaft intermediate said springs; a pinion on said shaft; a rack-bar pivoted to said draft-bar and meshing with said pinion; a casing containing bearings for said shaft and supporting said springs therein; an open-mouthed cylinder projecting toward the load end of said draft-bar and secured within said casing parallel with and intermediate said springs; a relatively long piston in said tube; an opening for the exit and entrance of air to said cylinder; a shell of antifriction material surrounding said piston; a connecting-rod extending toward the load end of said draft-bar and being loosely pivoted to said draft-bar and to said piston at points between the axis of said springs; a bend in said connection to avoid contact with one or more of said parts; suspending means pivoted to said casing at a point above and between said springs and vertically above the point of connection of the load-applying means with the draft-bar; and the points of connection of said suspension and load-applying means, the springs, cylinder, draft-bar, and said connection between said piston and draft-bar being all in substantially the same vertical plane; substantially as specified.

6. In a spring-balance scale, the combination of a spring-suspended draft-bar having on its lower end means for suspending the load, with a fixed dash-pot cylinder, its piston, and a piston-rod which is flexibly connected at one end with the draft-bar and at the other end with the piston, substantially as specified.

7. In a spring-balance scale, the combination of a cylindrical scale-case having a hole in its lower end, and a spring-suspended draft-bar which extends out through said hole and has on its lower end means for suspending the load, with a pneumatic tube closed at one end and open at the other, and having at its closed end external wings which are secured to the cylindrical scale-case, a piston movable in said tube, and a piston-rod which is flexibly connected at one end with the piston and at the other end with the draft-bar, substantially as specified.

JAMES L. MAULDIN.

Witnesses:
  GEO. W. TIBBITTS,
  GEO. D. HILE.